United States Patent [19]
Clark et al.

[11] Patent Number: 5,956,735
[45] Date of Patent: *Sep. 21, 1999

[54] SYSTEM OF COMPRESSING THE TAIL OF A SPARSE LOG STREAM OF A COMPUTER SYSTEM

[75] Inventors: Carl Edward Clark, Poughkeepsie; Steven Jay Greenspan, Hyde Park, both of N.Y.

[73] Assignee: International Business Machines Corporation, Armonk, N.Y.

[*] Notice: This patent is subject to a terminal disclaimer.

[21] Appl. No.: 08/827,558

[22] Filed: Mar. 28, 1997

[51] Int. Cl.$^6$ ............................................. G06F 12/00
[52] U.S. Cl. ........................... 707/206; 707/202; 714/6
[58] Field of Search ..................... 711/114; 707/202, 707/205, 206; 395/183.21, 182.04; 714/45, 6

[56] References Cited

U.S. PATENT DOCUMENTS

| | | | |
|---|---|---|---|
| 4,878,167 | 10/1989 | Kapulka et al. | |
| 5,090,014 | 2/1992 | Polich et al. | 371/15.1 |
| 5,121,475 | 6/1992 | Child et al. | 395/153 |
| 5,155,678 | 10/1992 | Fukumoto et al. | 395/425 |
| 5,191,651 | 3/1993 | Halim et al. | |
| 5,280,611 | 1/1994 | Mohan et al. | 395/600 |
| 5,339,427 | 8/1994 | Elko et al. | 395/725 |
| 5,345,590 | 9/1994 | Ault et al. | 395/650 |
| 5,394,554 | 2/1995 | Elko et al. | 395/800 |
| 5,410,695 | 4/1995 | Frey et al. | 395/650 |
| 5,463,736 | 10/1995 | Elko et al. | 395/848 |
| 5,469,463 | 11/1995 | Polich et al. | 395/182.18 |
| 5,471,631 | 11/1995 | Beardsley et al. | 395/650 |
| 5,481,689 | 1/1996 | Stamm et al. | 395/412 |
| 5,493,668 | 2/1996 | Elko et al. | 395/457 |
| 5,530,850 | 6/1996 | Ford et al. | 707/206 |
| 5,537,574 | 7/1996 | Elko et al. | 395/468 |
| 5,537,588 | 7/1996 | Engelmann et al. | 707/202 |
| 5,551,003 | 8/1996 | Mattson et al. | 711/136 |
| 5,737,600 | 4/1998 | Geiner et al. | 395/616 |

OTHER PUBLICATIONS

"LRAID: Use of Log Disks for an Efficient RAID Design," IBM Technical Disclosure Bulletin, vol. 37, No. 02A, pp. 19–20 (Feb. 1994).

"MVS Programming Assembler Services Reference", IBM Publication No. GC28–1910–01, Sep. 1996.

"MVS Programming Assembler Services Guide", IBM Publication No. GC28–1762–01, Sep. 1996.

Jones, Richard and Lins, Rafael, "Garbage Collection, Algorithms for Automated Dynamic Memory Management," John Wiley & Sons, Aug. 1996, pp. 28–33 and 97–111.

Rosenblum, Mendel and Ousterhout, Johm K., "The Design and Implementation of a Log–Structured File System," ACM Transactions on Computer Systems, vol. 10, No. 1, Feb. 1992, pp. 26–52.

*Primary Examiner*—Richard L. Ellis
*Attorney, Agent, or Firm*—Lily Neff, Esq.; Heslin & Rothenberg, P.C.

[57] ABSTRACT

When a log stream has a determined amount of reusable space, the log stream is compressed in order to free up the reusable space. Compression of the log stream includes rewriting one or more active entries located at one or more positions of the log stream to one or more other locations, either within the same log stream or on another log stream. Thereafter, the rewritten entries are deleted from their previous positions within the log stream. Additionally, one or more logically deleted entries of the log stream is removed from the log stream. The resulting log stream is a compressed log stream.

23 Claims, 6 Drawing Sheets fig. 1 fig. 2 fig. 3 fig. 4 fig. 5 fig. 6 fig. 7a  fig. 7b fig. 8

5,956,735

SYSTEM OF COMPRESSING THE TAIL OF A SPARSE LOG STREAM OF A COMPUTER SYSTEM

TECHNICAL FIELD

This invention relates, in general, to the management of a log stream and, in particular, to compression of the log stream, when the log stream has a determined amount of reusable space.

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Tail Compression Of A Log Stream Using A Scratch Pad Of Logically Deleted Entries," by Clark et al., Ser. No. 08/827,560;

"System Of Compressing A Log Stream Using A Scratch Pad Of Logically Deleted Entries," by Clark et al., Ser. No. 08/828,465;

"A Method of One System Of A Multisystem Environment Taking Over Log Entries Owned By Another System," by Clark et al., Ser. No 08/827,205;

"One System Of A Multisystem Environment Taking Over Log Entries Owned By Another System," by Clark et al., Ser. No. 08/827,293;

"Tail Compression Of A Sparse Log Stream Of A Multisystem Environment," by Clark et al., Ser. No. 08/827,214;

"System Of Compressing The Tail Of a Sparse Log Stream Of A Multisystem Environment," by Clark et al., Ser. No. 08/827,559;

"Tail Compression Of A Sparse Log Stream Of A Computer System," by Clark et al., Ser. No. 08/827,292.

BACKGROUND ART

In various computer systems, historical log data is maintained (for example, in log files) for use in system recovery, problem determination and/or system maintenance. Typically, these log files have a limited amount of capacity to retain the historical data. After the capacity is met, at least some of the data records are moved from the log files to external storage devices, such as direct access storage devices (DASD), thereby providing additional space in the log file for more data.

At some point, data within the log file and/or on the external storage devices is no longer needed. For example, there is no need to keep the data once it passes its retention requirements. The saving of data past its usefulness adversely affects system performance in a number of ways. For example, when unnecessary data is retained and the log file needs to be browsed to recover logged data during recovery of a failure, the browser may have to deal with potentially large amounts of unnecessary data, thereby slowing down the recovery process. Additionally, when the saving of unwanted data records requires the use of external storage devices, which typically provide slower access to the data, the reading of the data takes longer, thus, affecting system performance.

Therefore, it is beneficial to delete any unnecessary data from the log files. However, generally, there are a number of restrictions placed on what data can be deleted. In one example, data may only be deleted from the tail of the log file. Thus, if the data record at the tail is still necessary, then no data can be deleted from the log file. This forces the saving of many unnecessary or unwanted data records.

Thus, a need exists for a technique that allows the removal of unnecessary data records from a log file, even when the data record at the tail is still wanted.

SUMMARY OF THE INVENTION

The shortcomings of the prior art are overcome and additional advantages are provided through the provision of a log stream compression system. The log stream compression system includes a compressible set of entries, which includes a plurality of entries of the log stream. The system also includes a system adapted to rewrite one or more active entries of the compressible set, located at one or more first locations of the log stream, to one or more second locations. The rewriting occurring when the log stream includes a predefined amount of reusable space.

In a further embodiment of the invention, a log stream compression system is provided. The log stream compression system includes a deletion point within the log stream; and a system adapted to rewrite one or more active entries of one or more first positions of the log stream to one or more second positions of the log stream. The one or more active entries is located in a compression zone, which is between the deletion point and another point of the log stream, inclusive of the deletion point and the another point.

In another embodiment of the invention, a system for compressing a log stream is provided. The system includes, for example, means for locating a logically deleted element on a first queue, in which the first queue includes a plurality of elements representative of a plurality of entries of the log stream; means for dequeuing from the first queue the logically deleted element and one or more other elements of the first queue; means for enqueuing onto a second queue the dequeued elements; and means for rewriting one or more entries of one or more first positions of the log stream to one or more second positions of the log stream. The one or more entries corresponding to one or more active elements of the second queue.

In another aspect of the present invention, a system of compressing a log stream is provided. The log stream compression system includes, for instance, a system adapted to determine when the log stream includes a predefined amount of reusable space, and adapted to rewrite, when the log stream includes the predefined amount of reusable space, one or more entries of one or more first positions of the log stream to one or more second positions. The one or more entries being active entries.

The log compression capability of the present invention advantageously provides for the removal of unnecessary data records from the log stream, even when one or more entries at or near the tail of the log stream is still wanted. The invention provides for the rewriting of one or more entries at or near the tail to one or more other locations within the log stream or another log stream, so that unnecessary entries can be deleted and the log stream can be compressed.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims

BEST MODE FOR CARRYING OUT THE INVENTION

In accordance with the principles of the present invention, a log stream compression capability is provided in which entries that are still wanted or needed (i.e., active) are rewritten from one end of a log stream to another end of the log stream (or to another log stream), such that other unnecessary entries can be deleted and the log stream can be compressed.

Figure 1:
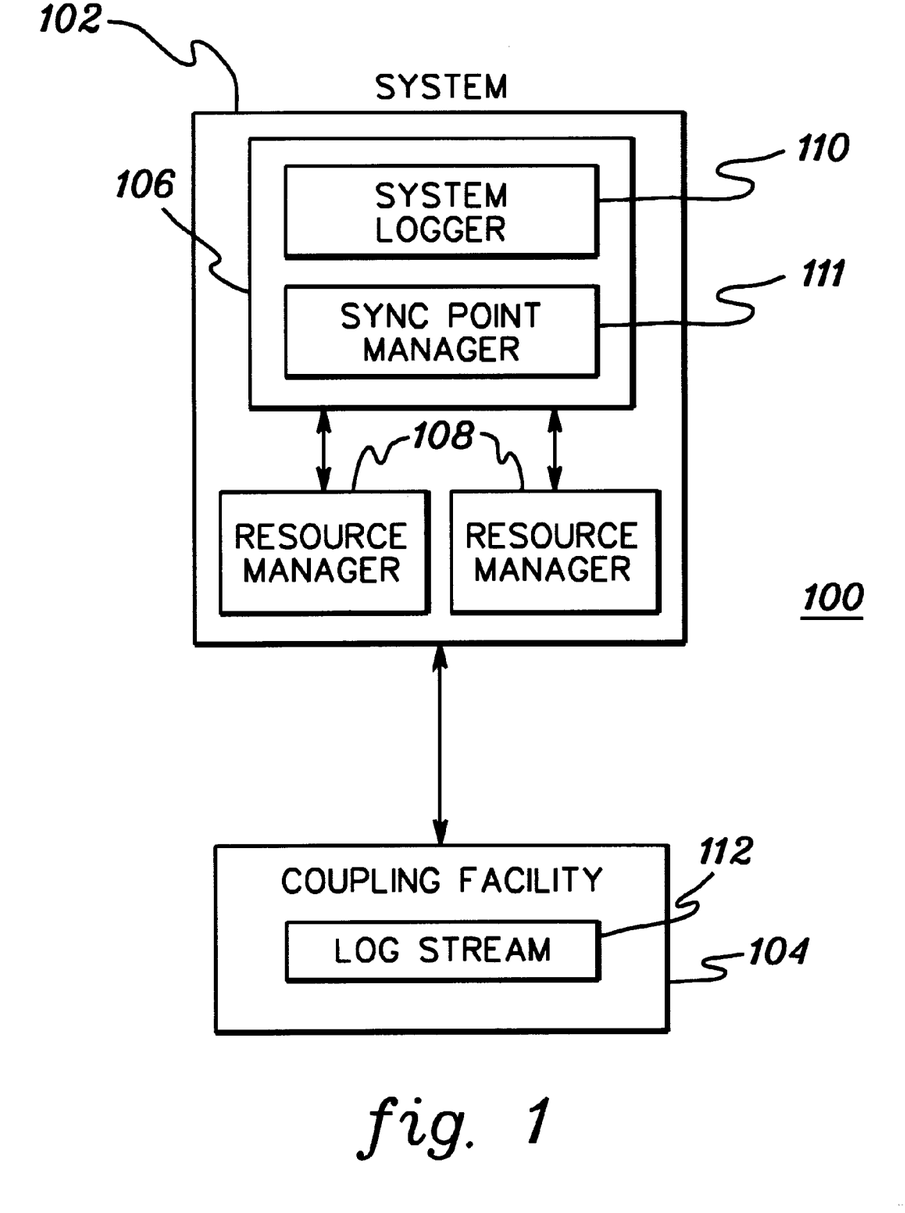
FIG. 1 depicts one example of a computer system incorporating and using the log stream compression capability of the present invention.

One example of a computer system incorporating and using the log stream compression capability of the present invention is depicted in FIG. 1 and described in detail herein. In one example, computer system 100 is based on the Enterprise Systems Architecture (ESA)/390 offered by International Business Machines Corporation, and includes a system 102 coupled to a coupling facility 104. System 102 includes an operating system 106 and one or more resource managers 108, each of which is described below.

In one embodiment, operating system 106 is, for instance, the Multiple Virtual Storage (MVS) operating system offered by International Business Machines Corporation (or the OS/390 operating system offered by International Business Machines Corporation). Operating system 106 includes, for instance, a system logger component 110 and a sync point manager 111, each of which is described below.

In one example, system logger 110 runs in its own address space started by the operating system. The system logger is used for the log stream compression capability of the present invention, as described below, and one embodiment of a system logger is described in MVS Programming Assembler Services Reference, IBM Publication No. GC28-1910-01 (September 1996); and MVS Programming Assembler Services Guide, IBM Publication No. GC28-1762-01 (September 1996), each of which is hereby incorporated herein by reference in its entirety.

Sync point manager 111 coordinates participants (such as resource managers) in a 2-phase commit protocol. One example of a sync point manager is a Resource Recovery Service, which may be offered by International Business Machines Corporation. The sync point manager is also involved in the compression technique of the present invention, as described below.

Each of resource managers 108 owns and controls a set of resources within the computer system. For example, a resource manager can be a database management facility, such as IMS or DB2, each of which is offered by International Business Machines Corporation.

As mentioned above, in one particular example, system 102 is coupled to coupling facility 104. Coupling facility 104 is a shareable facility that contains storage accessible by the system and performs operations requested by the resource managers and/or programs running within the system. In one embodiment, coupling facility 104 is a structured-external storage processor (SES). Examples of a coupling facility are described in detail in U.S. Pat. No. 5,317,739, entitled "Method and Apparatus for Coupling Data Processing Systems," by Elko et al., issued May 31, 1994, and in U.S. patent application Ser. No. 08/632,683 entitled, "Method And System For Log Management In A Coupled Data Processing System," by Geiner et al., filed on Apr. 15, 1996, both assigned to International Business Machines Corporation, and each of which is hereby incorporated herein by reference in its entirety.

In accordance with the principles of the present invention, coupling facility 104 includes a log stream 112. (Coupling facility 104 may include a plurality of log streams, and one or more of those log streams can be managed and compressed, in accordance with the principles of the present invention.) In one example, log stream 112 is accessible by system 102 and is capable of containing one or more entries for the system. In one embodiment, at least a portion of log stream 112 can be stored in one or more storage devices (e.g., direct access storage devices (DASD)), when, for example, sufficient space for the log stream no longer exists within the coupling facility.

One example of a log stream and various services corresponding to the log stream are described in detail in U.S. patent application Ser. No. 08/632,683 entitled, "Method And System For Log Management In A Coupled Data Processing System," by Geiner et al., filed on Apr. 15, 1996, which is hereby incorporated herein by reference in its entirety.

Figure 2:
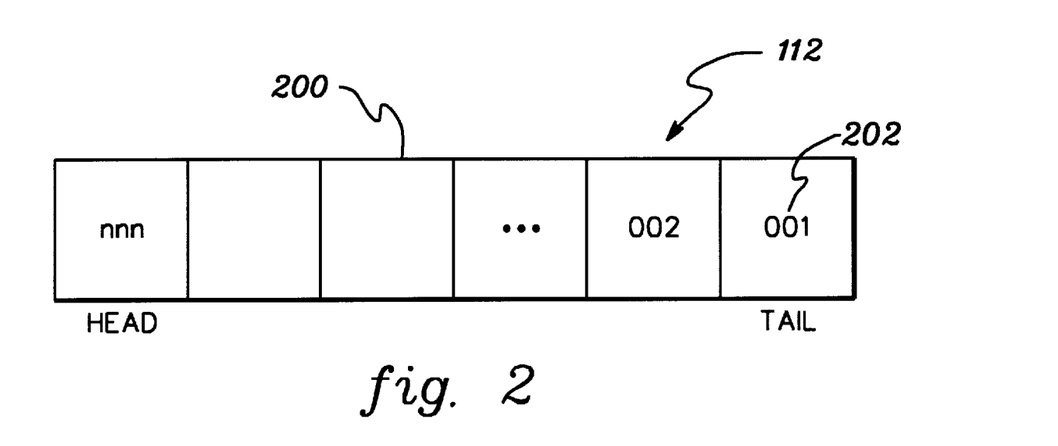
FIG. 2 depicts one example of a log stream of the computer system of FIG. 1, in accordance with the principles of the present invention.

One example of the components of log stream 112, used for the present invention, are described in detail with reference to FIG. 2. In one embodiment, log stream 112 includes a number of log blocks or log entries 200, each having a respective block identifier 202. Each block identifier corresponds to, for instance, a relative offset into the log stream. Data and other various information are also included in the log stream, but need not be discussed for the present invention.

One end of log stream 112 is referred to herein as the tail or rear of the log stream. In one embodiment, the rear of the log stream typically includes the oldest entry of the log stream (i.e., the entry with the oldest block id). The other end of the log stream is referred to herein as the head, which is forward from the tail or rear. (In another embodiment, it may be the head instead of the tail, which typically holds the oldest entry. The present invention equally applies to such a log stream.)

The log stream described above is only one example. In another embodiment, the log stream need not be included in a coupling facility. It can be, for instance, located in main storage, a cache, auxiliary storage, external storage devices, or any combination thereof.

In one embodiment of the present invention, entries of log stream 112 include data for resource managers 108. In one example, it is the sync point manager that instructs system logger to write the entries to the log stream for the resource managers. However, this is not necessary. One embodiment of adding entries to log stream 112 is described in detail with reference to FIG. 3.

Figure 3:
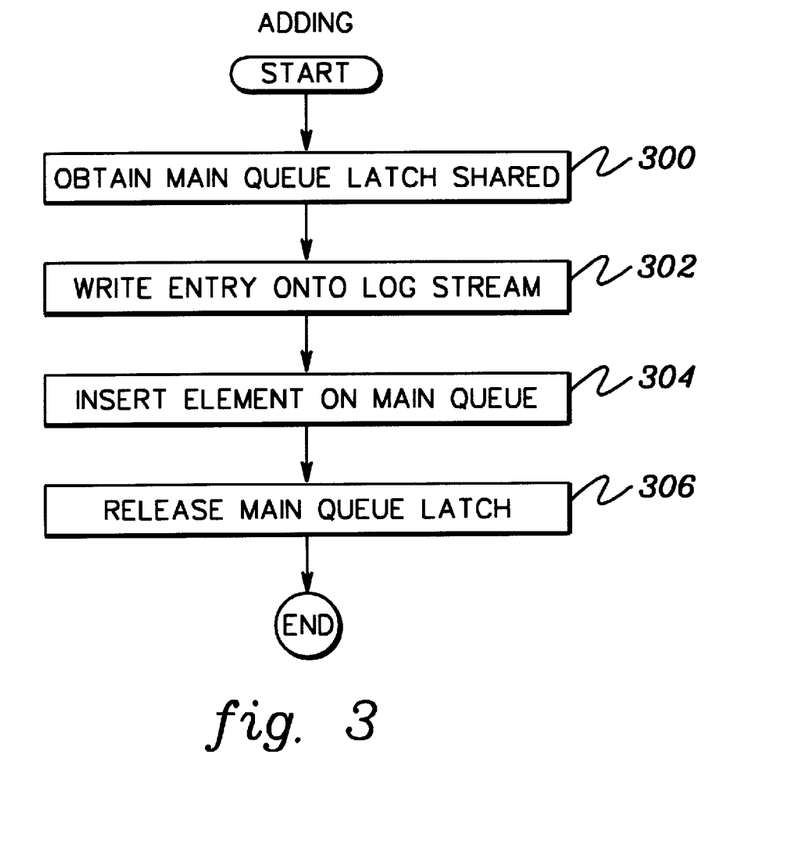
FIG. 3 depicts one example of the logic used in adding a new entry onto the log stream of FIG. 2, in accordance with the principles of the present invention.
Figure 4:
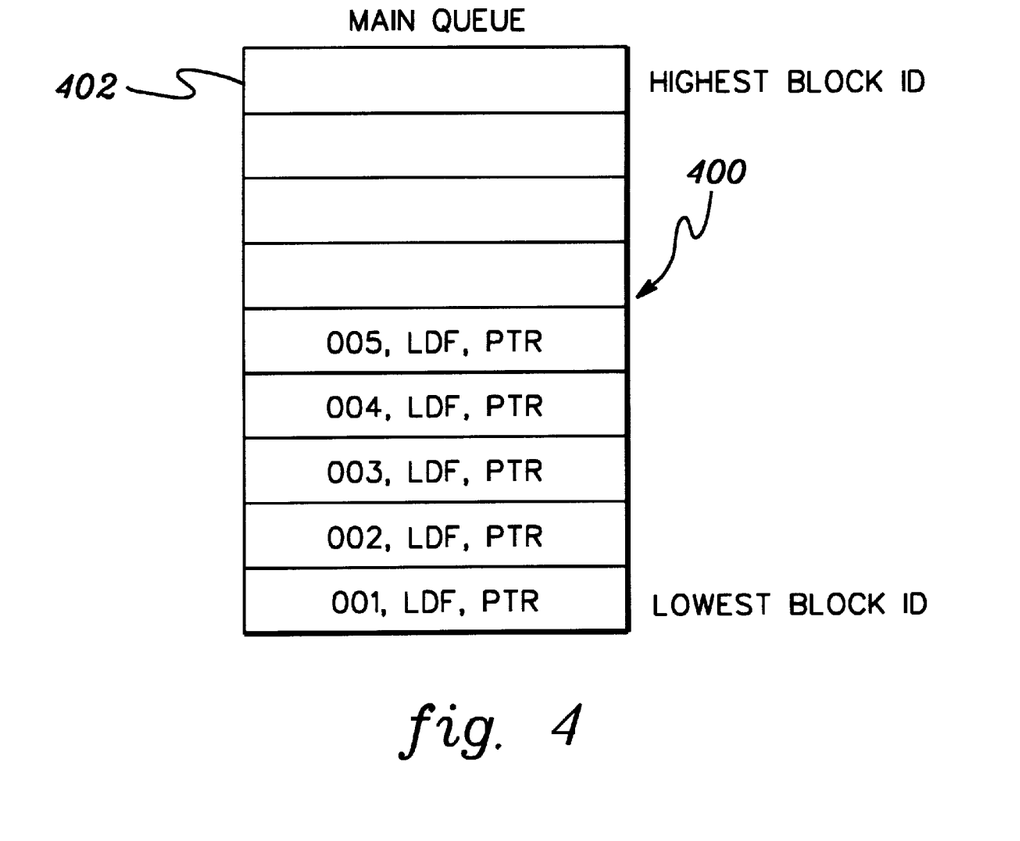
FIG. 4 depicts one embodiment of a main queue, used in accordance with the principles of the present invention.

Initially, a shared latch is obtained for a main queue located within system 102, STEP 300. The shared latch allows multiple entities, if any, to concurrently access the queue. The main queue is used herein to hold elements representative of entries within the log stream. One example of a main queue 400 is depicted in FIG. 4 and described below.

Main queue 400 includes, for instance, one or more elements 402. Each element includes a representation of an entry written onto the log stream. For instance, each element includes the block id of the corresponding log stream entry, and a logical deletion flag (LDF), which is described below. In this example, the data for the entry is not maintained within the queue, but stored separately in, for instance, main store, a cache, auxiliary storage, external storage devices, a coupling facility or any combination thereof. Thus, each element also includes a pointer (PTR) to the corresponding data for the entry represented by the element.

Returning to FIG. 3, subsequent to obtaining the latch, a new entry is added to the log stream and given a block id, STEP 302. In one example, the entry is written to the head of the log stream, and system logger 110 ensures that the block id is greater than the block ids already assigned.

Thereafter, a new element, referred to as a LGB, is inserted onto main queue 400 in order of the block id, STEP 304. In one example, the highest block id is at the top of the queue. In particular, the element is enqueued using compare and swap logic. This provides serialization for the queue, such that multiple updates to the queue are not occurring at the same time.

Subsequently, the latch is released, STEP 306, and the addition process is complete.

When an entry on the log stream is no longer needed (e.g., its retention requirements have been met), then the entry is logically deleted. In particular, the entry physically remains on the log stream until the log stream is, for instance, compressed. One example of logically deleting an entry of the log stream is described in detail below with reference to FIG. 5. In one embodiment, the steps of FIG. 5 are performed by the sync point manager.

Figure 5:
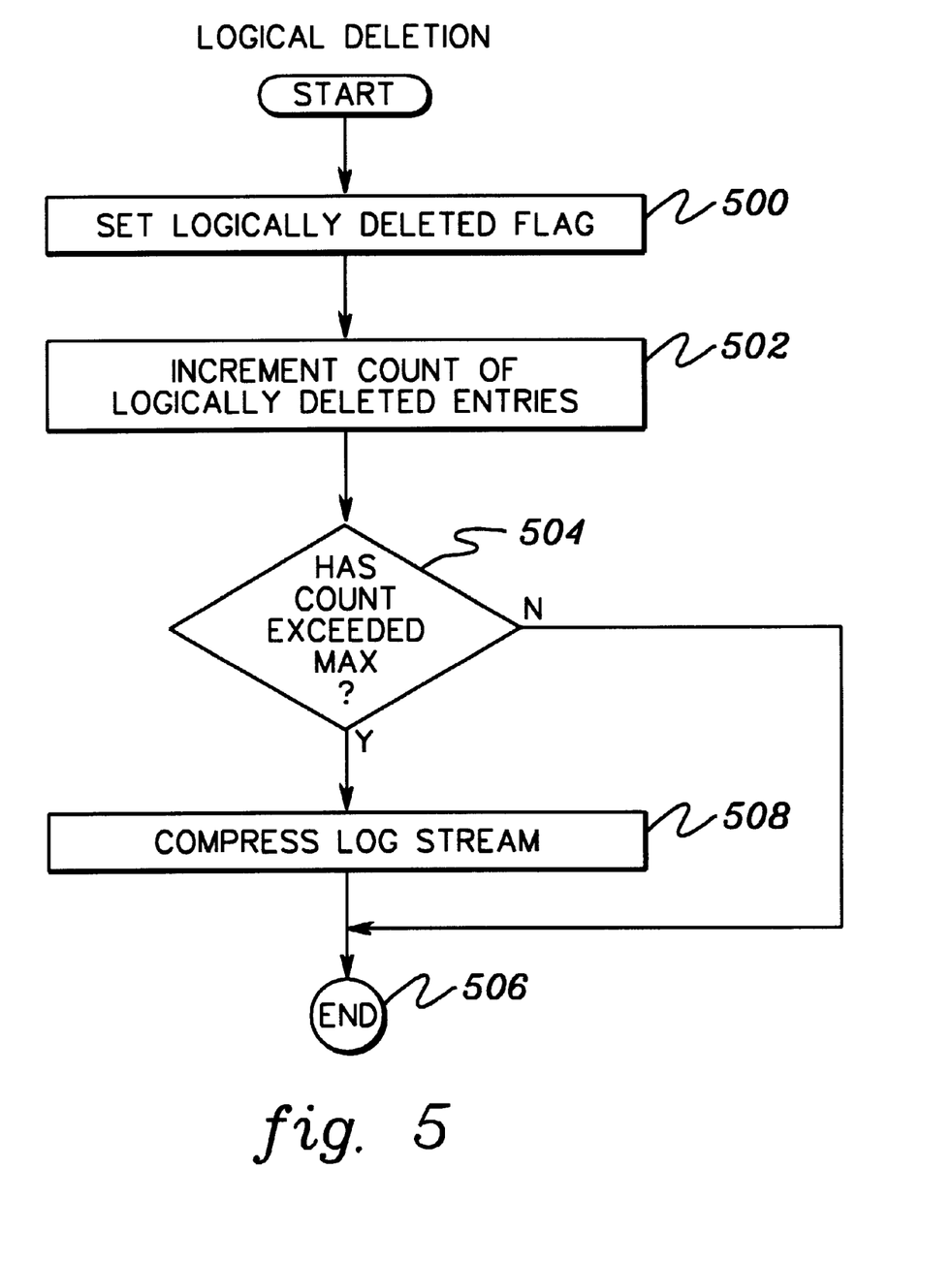
FIG. 5 depicts an embodiment of the logic used to logically delete an entry from the log stream of FIG. 2, in accordance with the principles of the present invention.

Referring to FIG. 5, initially, the logical deletion flag for the entry to be deleted is set in the main queue, STEP 500. This flag indicates that the entry is no longer needed (i.e., it is inactive) and can be physically removed from the log stream at the appropriate time.

Subsequently, a count of logically deleted elements is incremented by one, STEP 502. This count is maintained, for instance, within system storage; however, it also can be maintained within the coupling facility or on external storage devices, as other examples.

Next, a determination is made as to whether the count has exceeded a predetermined maximum value, STEP 504. In one example, the maximum value is based on, for instance, a percentage (e.g., 50%) of the number of logically deleted entries within the log stream. However, the maximum value can be based on any desired relationship. Additionally, the percentage can be any desired percentage.

If the count has not exceeded its limit, then the logical deletion procedure is complete, STEP 506. However, if the count has exceeded the limit, then the log stream is compressed, in the manner described below, STEP 508.

Figure 6:
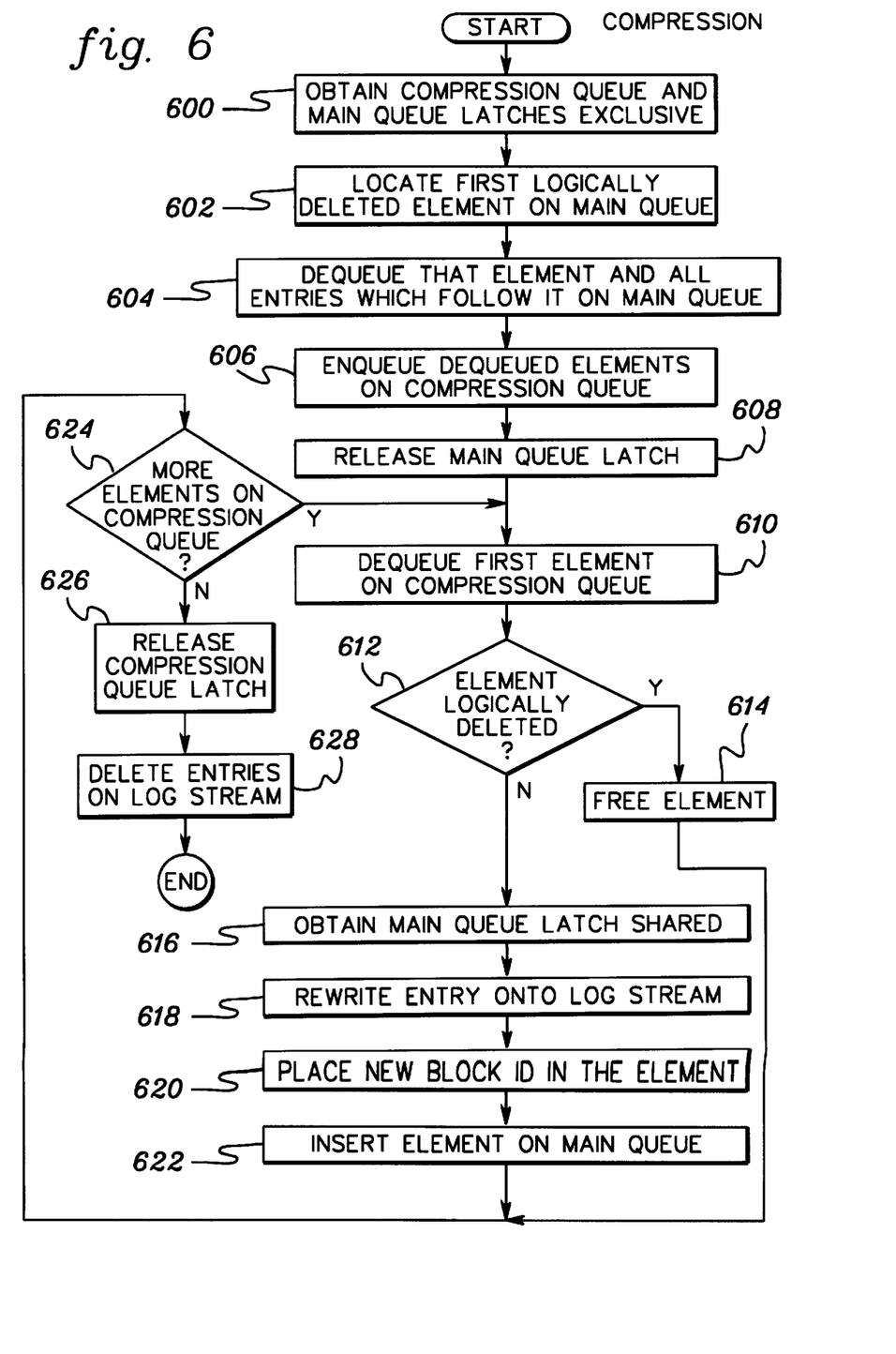
FIG. 6 depicts one embodiment of the logic used to compress the log stream of FIG. 2, in accordance with the principles of the present invention.

One example of compressing a log stream, by, for instance, the sync point manager, is described in detail with reference to FIG. 6. In one example, initially, the latch for the main queue is obtained exclusively, as well as the latch for a compression queue, STEP 600. The exclusive latch, prevents any other entity within the system from writing to the queue, until the latch is released. The compression queue includes, in accordance with the principles of the present invention, those entries to be processed during the log stream compression, as described in detail below.

Subsequent to obtaining the latches exclusive, the first element (i.e., LGB) on the main queue that has been logically deleted is located, STEP 602. For example, the logical deletion flag for each element of the main queue, starting at the last element written to the queue, is checked until the element having a set flag is found. The block id corresponding to that element is saved as a tail head id.

Next, the first element on the main queue that has been logically deleted, as well as all the other entries which follow it (these entries are referred to herein as entries of a compressible set or entries within a compression zone) are dequeued from the main queue, STEP 604, and enqueued onto the compression queue, STEP 606. (The elements of the compression queue have the same format as the elements of the main queue, in one example.)

Figure 7A:
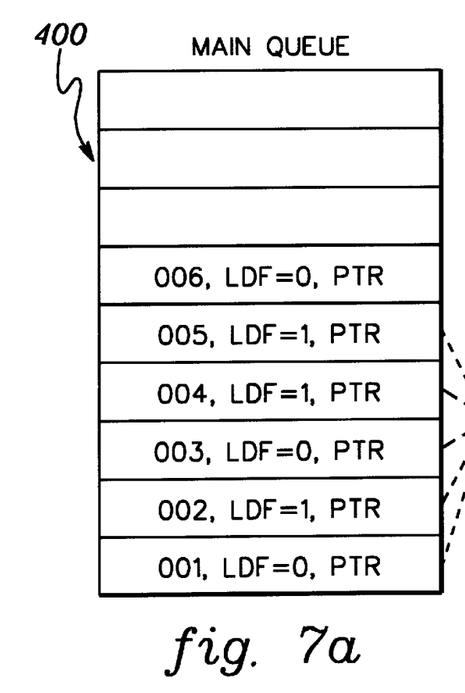
FIG. 7a depicts another example of the main queue of FIG. 4, in accordance with the principles of the present invention.
Figure 7B:
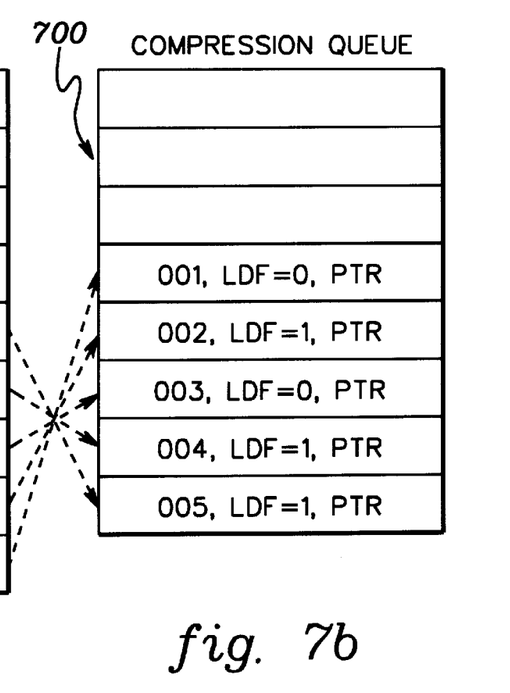
FIG. 7b depicts one example of a compression queue used in accordance with the principles of the present invention.

For example, referring to the illustrations depicted in FIGS. 7a and 7b, if the first element on main queue 400 that is logically deleted (LDF=1) corresponds to block id 005, then block id 005 is removed from the main queue and placed on a compression queue 700, along with block ids 004-001.

Subsequently, the main queue latch is released, STEP 608.

Thereafter, the first element on compression queue 700 is dequeued (e.g., block id 001), STEP 610, and a determination is made as to whether that element is logically deleted, INQUIRY 612. If the element is logically deleted (LDF=1), then that element is freed (e.g., put on a free queue for reuse by the compression technique), STEP 614.

Figure 8:
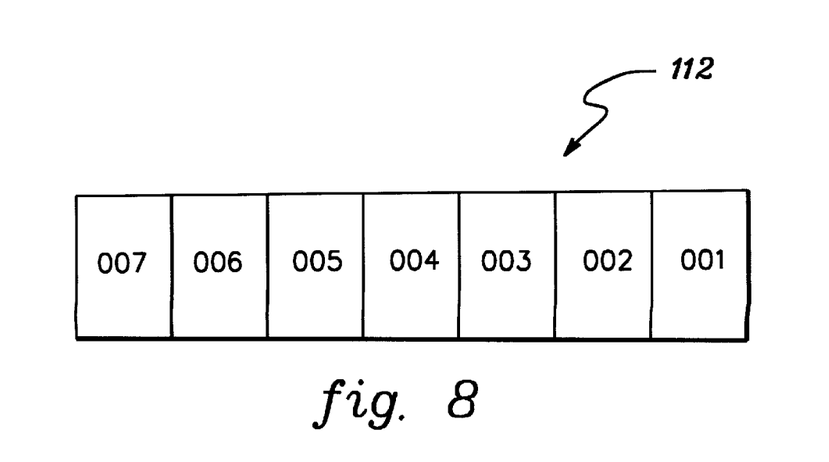
FIG. 8 depicts another example of the log stream of FIG. 2, in which the first entry has been rewritten as the seventh entry, in accordance with the principles of the present invention.

If, however, the element is not logically deleted (LDF=0), then the main queue latch shared is obtained, STEP 616, and the log entry corresponding to the element is rewritten on the log stream, STEP 618. For example, the log stream entry having block id 001 has not been logically deleted, in this one illustrative example (see element of FIG. 7b having block id 001), thus, the log stream entry represented by block id 001 is rewritten to another location within the log stream. In particular, in one example, a copy of the contents of block id 001 is obtained from storage (as indicated by the pointer located in the compression queue) and placed in an entry at the head of the log stream. That entry is then given a new block id (e.g., block id 007 (see FIG. 8)). When an entry is given a new block id, it is considered herein as a new entry, even though the data located in the entry may be older than the data of other entries.

In addition to the above, the new block id (e.g., block id 007) is placed in an element, STEP 620, which is inserted onto the main queue in order of block id, STEP 622.

Subsequent to inserting the element on the main queue or after the element has been freed, a determination is made as to whether there are more elements on the compression queue to be processed, INQUIRY 624. If there are more elements, processing continues at STEP 610 "DEQUEUE FIRST ELEMENT ON COMPRESSION QUEUE." However, if there are no more entries to be processed, then the compression queue latch is released, STEP 626.

Thereafter, system logger 110 deletes the entries off of the tail of the log stream starting at the tail head id, STEP 628. In the above example, the tail head id is equal to block id 005, thus, entries 005-001 are removed from the log stream. Thus, block id 006 becomes the new tail of the log stream, and the compression technique is complete.

The above-described compression procedure is only one example. Many variations are possible and therefore, are considered within the scope and spirit of the claimed invention. For example, in another embodiment, the compression queue is eliminated and the elements are processed directly on the main queue, similar to that described above.

In yet another embodiment, the compression queue is once again eliminated, and the elements on the main queue are processed starting at the tail of the queue (i.e., the first element on the queue (e.g., block id 001)). If that element is still needed, the data corresponding to that element is located in storage and rewritten to the head of the log stream, as described above. If, however, that element is not needed, then the element is freed, as described above. This processing continues up the main queue from the tail to the head, until a predefined number of unwanted entries have been freed. After freeing the requisite number of entries, the system logger is instructed to remove the appropriate entries from the tail of the log stream.

In yet a further embodiment of the invention, the entries are not rewritten to the head of the same log stream, but instead to another log stream. The second log stream is also compressed in accordance with the technique of the present invention; however, in one example, it is compressed less often than the main log stream.

Described above in detail is a log compression facility that enables tail compression to be performed on a single system log stream. In accordance with one example of the present invention, the log stream entries that are still active (i.e., not ready to be removed from the log stream) and those entries that have been logically deleted (i.e., ready to be removed from the log stream) are tracked, and a determination is made as to when the log stream is sparse (a predetermined number of unneeded entries). When the log stream is sparse, compression is performed.

As described above, a log stream includes one or more datum (e.g., log data). Thus, other entities that include one or more datum are included within the definition of a log stream. These entities include, but are not limited to, log files and log data sets. The invention is particularly applicable to those log streams that cannot have information within an entry deleted or changed, when the entry is not at an end of the log stream (e.g., the tail or the head). Additionally, the invention is applicable, for example, to log streams that do not include time dependent entries.

The computer system described above is only one example. The present invention can be used and/or incorporated within other systems or environments without departing from the spirit of the present invention. For example, different architectures and/or operating systems can be used without departing from the spirit of the present invention. Further, in another embodiment, the computer system can include multiple coupling facilities. Additionally, the present invention is applicable to computer systems that do not include a coupling facility.

In yet a further embodiment, the system logger can be a separate component from the operating system. Further, components other than the system logger can write to and delete entries from the log stream. In yet a further embodiment, the sync point manager is not the only component that can perform the compression technique of the present invention. In another embodiment, other components of the system can perform the compression technique, including, but not limited to, the resource managers. Again, the computer system described herein is only one example.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A log stream compression system comprising:
   a compressible set of entries, said compressible set comprising a plurality of entries of said log stream, said plurality of entries comprising one or more, but less than all, active entries of said log stream; and
   a system adapted to rewrite one or more active entries of said compressible set, located at one or more first locations of said log stream, to one or more second locations, the rewriting occurring when said log stream includes a determined amount of reusable space.

2. The log stream compression system of claim 1, wherein said system is adapted to remove said one or more rewritten entries from said one or more first locations, and adapted to remove one or more logically deleted entries of said compressible set from said log stream.

3. The log stream compression system of claim 1, wherein said one or more first locations is at or near a tail of said log stream, and said one or more second locations is at or near a head of said log stream.

4. The log stream compression system of claim 1, wherein at least one of said one or more second locations is within another log stream.

5. The log stream compression system of claim 1, wherein said predefined amount of reusable space is based on a count of logically deleted entries of said log stream.

6. The log stream compression system of claim 1, further comprising means for defining said compressible set.

7. The log stream compression system of claim 6, wherein said means for defining comprises:
   means for locating a logically deleted entry of said log stream; and
   means for selecting one or more entries located between said logically deleted entry and another entry of said log stream, inclusive of said logically deleted entry and said another entry.

8. The log stream compression system of claim 7, wherein said another entry is an entry at said tail of said log stream.

9. The log stream compression system of claim 7, wherein said means for locating comprises means for searching a first queue to find said logically deleted entry, said first queue comprising a plurality of elements representative of a plurality of entries of said log stream.

10. The log stream compression system of claim 9, wherein said means for selecting comprises:

means for deleting from said first queue one or more elements representative of said one or more entries located between said logically deleted entry and said another entry, inclusive of said logically deleted entry and said another entry; and means for inserting said one or more elements on a second queue, said one or more elements on said second queue corresponding to said compressible set.

11. A log stream compression system comprising:

a deletion point within said log stream; and a system adapted to rewrite one or more active entries of one or more first positions of said log stream to one or more second positions of said log stream, said one or more active entries being located in a compression zone, said compression zone being between said deletion point and another point of said log stream, inclusive of said deletion point and said another point, wherein one or more active entries not included within said compression zone are not rewritten.

12. The log stream compression system of claim 11, wherein said one or more first positions is at or near a tail of said log stream and said one or more second positions is at or near a head of said log stream.

13. The log stream compression system of claim 11, wherein said deletion point comprises a last entry within said log stream to be logically deleted.

14. The log stream compression system of claim 11, wherein said system is further adapted to perform said compressing when a count of logically deleted entries of said log stream has reached a predefined limit.

15. The log stream compression system of claim 11, wherein said system is further adapted to remove one or more logically deleted entries located within said compression zone from said log stream.

16. The log stream compression system of claim 11, wherein said system is further adapted to remove said one or more active entries from said one or more first positions.

17. A system of compressing a log stream, said system comprising:

means for locating a logically deleted element on a first queue, said first queue comprising a plurality of elements representative of a plurality of entries of said log stream;

means for dequeuing from said first queue said logically deleted element and one or more active elements of said first queue;

means for enqueuing onto a second queue the dequeued elements; and means for rewriting one or more entries of one or more first positions of said log stream to one or more second positions of said log stream, said one or more entries corresponding to one or more active elements of said second queue.

18. The log stream compression system of claim 17, further comprising means for removing from said log stream one or more of the enqueued elements.

19. The log stream compression system of claim 17, wherein said one or more first positions is at or near a tail of said log stream and said one or more second positions is at or near a head of said log stream.

20. The log stream compression system of claim 17, wherein at least one of said one or more second positions is on another log stream.

21. A log stream compression system comprising:

a system adapted to determine when a log stream includes a predefined amount of reusable space, said system adapted to determine comprising adapted to check whether a count of logically deleted entries of said log stream has reached a predefined limit; and said system being further adapted to rewrite, when said log stream includes said predefined amount of reusable space, one or more entries of one or more first positions of said log stream to one or more second positions, said one or more entries being active entries.

22. The log stream compression system of claim 21, wherein said system is further adapted to remove said one or more rewritten entries from said one or more first positions, and to remove one or more logically deleted entries from said log stream.

23. The log stream compression system of claim 21, wherein at least one of said one or more second positions comprises one of the following:

a location at or near a head of said log stream; and a location within another log stream.

* * * * *

UNITED STATES PATENT AND TRADEMARK OFFICE
CERTIFICATE OF CORRECTION

PATENT NO. : 5,956,735
DATED : September 21, 1999
INVENTOR(S) : Clark et al.

It is certified that error appears in the above-identified patent and that said Letters Patent is hereby corrected as shown below:

Claim 21, Col. 10, line 30, delete "comprising adapted" and replace with --comprising being adapted--.

Signed and Sealed this

Sixteenth Day of May, 2000

Attest:

Q. TODD DICKINSON

*Attesting Officer*       *Director of Patents and Trademarks*